(No Model.)
E. J. CORSER.
GRAIN DRILL.
No. 604,024. Patented May 17, 1898.
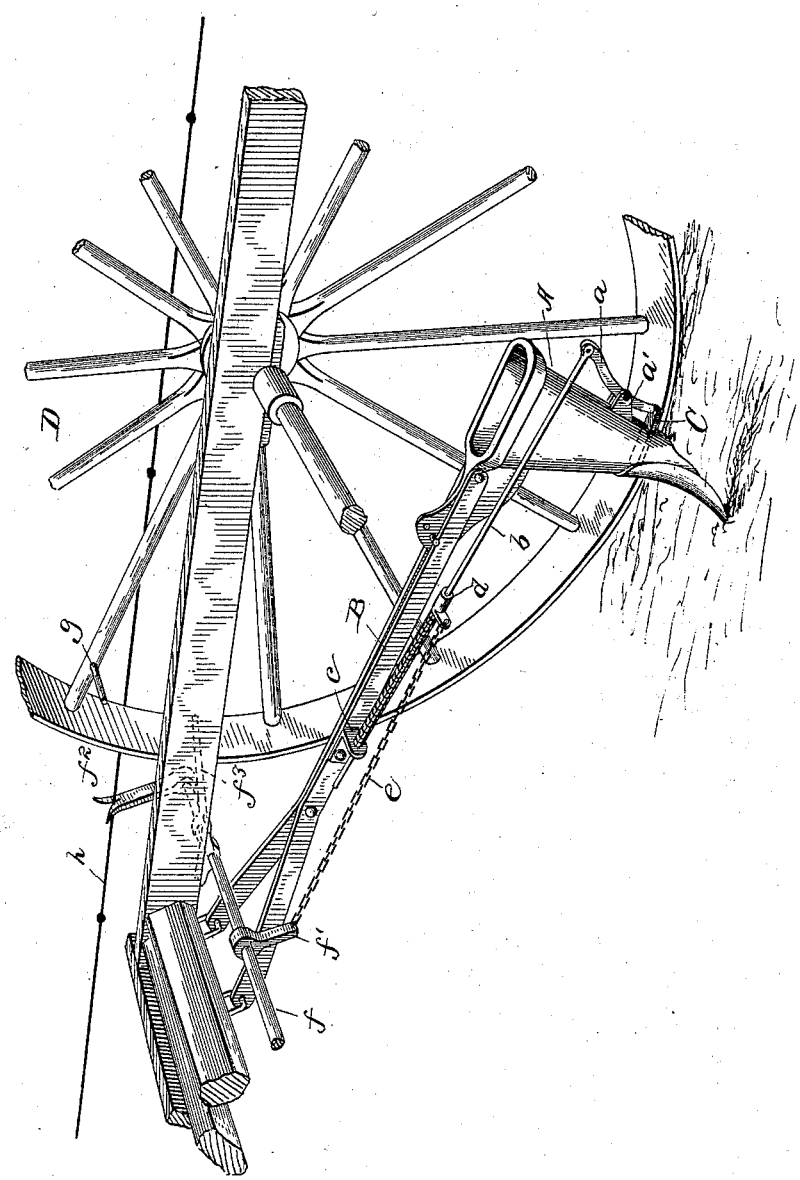
Witnesses
Wm H Edwards Jr
Howard D. Orr.
Edson J. Corser.
Inventor.
By Edson Bro's,
Attorneys.

United States Patent Office.

EDSON J. CORSER, OF MACEDON, NEW YORK.

GRAIN-DRILL.

SPECIFICATION forming part of Letters Patent No. 604,024, dated May 17, 1898.

Application filed December 18, 1897. Serial No. 662,472. (No model.)

*To all whom it may concern:*

Be it known that I, EDSON J. CORSER, a citizen of the United States, residing at Macedon, in the county of Wayne and State of New York, have invented certain new and useful Improvements in Grain-Drills; and I do hereby declare the following to be a full, clear, and exact description of the invention, such as will enable others skilled in the art to which it appertains to make and use the same.

My invention relates to improvements in grain-drills.

It has for its object to provide for the dropping or planting of corn, beans, and other small seed in hills, as also to drill in rows; and it consists of the combination, arrangement, and construction of parts, substantially as hereinafter more fully disclosed, and specifically pointed out in the claims.

In the accompanying drawing, illustrating the preferred form of carrying out my invention, the figure is a perspective view of a seed-drill embodying the same, showing it adapted to be actuated by the ordinary check-row wire or by the wheel.

Latitude is allowed herein as to matters of details, as they may be varied without departing from the spirit of my invention and the same yet remain intact.

A refers to the ordinary seed boot and drill, connected to its casing or frame by a drag-bar B in the usual way.

C is the valve for planting or dropping the seed at intervals in hills and drilling it in rows, the same consisting of a plate or slide arranged in the said boot A and connected to a lever $a$, pivoted between parallel studs or projections $a'$ on the rear side of said seed-boot. The lever $a$ has connected to its upper end a guide-rod $b$, extending forward through and resting in an apertured plate or bracket $c$, secured to the side of the drag-bar B. The rod $b$ has fixed thereon the sleeve or tubular portion of a lateral arm or projection $d$, and to this arm or projection is connected a chain or line $e$, also connected to an arm $f'$ of a rock-shaft $f$, suitably hung upon the under side of the carrying-frame. The rock-shaft $f$ has fixed to it two additional arms $f^2 f^3$, either one or both of which are adapted to actuate the seed-dropping valve or slide C, as shown, thereby dropping or planting the seed at the desired points. These arms are operated in the manner shown, arm $f^3$ being so arranged as to be struck by a stud or pin $g$ on a spoke of one of the transporting-wheels D, while arm $f^2$ is normally held in a vertical position and adapted to be operated by means of an ordinary check-row wire $h$, the balls or checks of which engage with its forked or bifurcated end. It will be seen that by this latter arrangement the seed-dropping operation can also be effected during the return movement of the machine.

Having thus fully described my invention, what I claim, and desire to secure by Letters Patent, is—

1. In a grain-drill, the seed valve or slide arranged in the seed-boot and operated by a lever pivoted upon the latter, the rock-shaft having a chain or line connection with said valve or slide lever and having an arm adapted to be operated by a check-row wire, and a second arm adapted to be struck by a stud or projection on the transportation-wheel, substantially as set forth.

2. In a grain-drill, the seed slide or valve arranged in the seed-boot and carried by a lever pivoted upon the latter, the guide-rod connected to said slide or valve lever and adapted to pass through and rest in a bracket on the drill drag-bar, a chain or line connected to a lateral stud or projection arranged on said rod, said rock-shaft having two additional arms adapted to be actuated, one by the check-row wire, and the other by a stud or projection of the wheel of the machine, substantially as set forth.

In testimony whereof I affix my signature in presence of two witnesses.

EDSON J. CORSER.

Witnesses:
   WM. S. EDDY,
   CHAS. H. ELY.